(12) United States Patent
Sharkey

(10) Patent No.: US 8,434,110 B2
(45) Date of Patent: *Apr. 30, 2013

(54) INTUITIVE ELECTRONIC PROGRAM GUIDE DISPLAY

(75) Inventor: Jeffrey L. Sharkey, Hermosa Beach, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 161 days.

This patent is subject to a terminal disclaimer.

(21) Appl. No.: 12/914,629

(22) Filed: Oct. 28, 2010

(65) Prior Publication Data

US 2011/0047576 A1 Feb. 24, 2011

Related U.S. Application Data

(63) Continuation of application No. 11/782,787, filed on Jul. 25, 2007, now Pat. No. 7,849,482.

(51) Int. Cl.
*H04N 5/445* (2011.01)
*G06F 3/01* (2006.01)

(52) U.S. Cl.
USPC .............................. 725/46; 715/747

(58) Field of Classification Search .................. None
See application file for complete search history.

(56) References Cited

U.S. PATENT DOCUMENTS

| | | | |
|---|---|---|---|
| 6,481,011 B1 * | 11/2002 | Lemmons | 725/47 |
| 6,501,514 B1 * | 12/2002 | Townsend et al. | 348/734 |
| 6,973,663 B1 * | 12/2005 | Brown et al. | 725/39 |
| 2006/0080709 A1 * | 4/2006 | Kwon et al. | 725/46 |
| 2006/0212900 A1 * | 9/2006 | Ismail et al. | 725/34 |
| 2007/0039023 A1 * | 2/2007 | Kataoka | 725/46 |

* cited by examiner

*Primary Examiner* — Kristine Kincaid
*Assistant Examiner* — Oschta Montoya

(57) ABSTRACT

A method and system for generating an electronic program guide includes a receiving unit 28 having a controller module 60. The controller module 60 receives television content and electronic programming guide data. The controller module 60 separates the program guide data from the television content and stores the program guide data. The controller 60 determines user preferences and changes a display of the electronic program guide in response to the user preferences.

8 Claims, 6 Drawing Sheets

INTUITIVE ELECTRONIC PROGRAM GUIDE DISPLAY

TECHNICAL FIELD

The present disclosure relates generally to displaying programming information to a user of a service, and, more specifically, to providing an improved electronic program guide.

BACKGROUND

The statements in this section merely provide background information related to the present disclosure and may not constitute prior art.

Satellite television has become increasingly popular due to the wide variety of programming available. Program guides are typically provided by satellite television distributors to generate a list of content available on the various channels. Program guides may also convey other information including, but not limited to, a short description of the content. However, as the amount of satellite television channels and programming increases, the amount of information to be displayed on the program guide also has increased.

People with various visual difficulties may find certain information on the programming guide difficult to read. Therefore, it may be desirable to increase the utility of an electronic program guide.

SUMMARY

The present disclosure sets forth a method for changing the display based upon various user preferences. The user preferences may correspond to programming the user may find interesting. The interest in the programming may be made by the user or learned over the course of use or a combination of both.

In one aspect of the disclosure, a method of generating an electronic program guide includes receiving television content and electronic program guide data, separating the program guide data from the television content, storing the program guide data, determining user preferences and changing a display of the electronic program guide in response to the user preferences.

In a further aspect of the disclosure, a system for generating a program guide includes a receiving unit having a controller module that receives the television content and the electronic program guide data, separates the program guide data from the television content, stores the program guide data, determines user preferences, and changes a display of the program guide data in response to the user preferences.

The controller may have various modules including a separation module for separating the data, a preference module for determining preferences at one display module for changing a video and/or an audio display.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
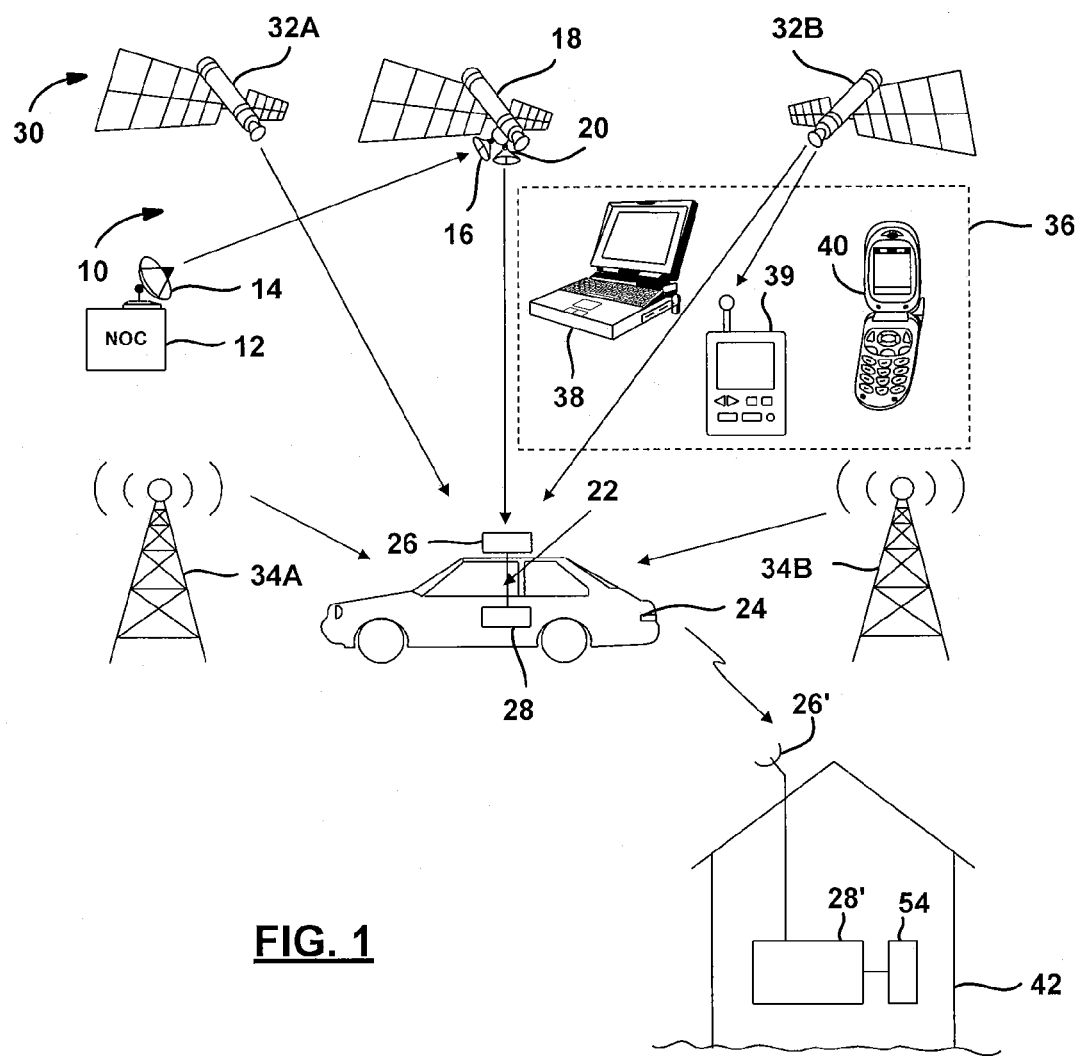
FIG. 1 is a system level view of a satellite broadcasting system according to the present invention.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is suitable for various uses including fixed home-based uses or mobile uses. The present disclosure improves the utility of the electronic program guide by making programs that may be of interest to a user easier to find.

Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a satellite 18. The wireless signals, for example, may be digital. A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. The wireless signals include both television content and electronic program guide content.

The present disclosure may be incorporated in a mobile receiving system 22. A mobile receiving system may include relatively small display screens. The present disclosure improves the utility of such displays. As illustrated, the mobile receiving system 22 is disposed within an automotive vehicle 24. A receiving antenna 26 receives the wireless signals from the satellite 18 and processes the signals in a mobile receiving unit 28. The mobile receiving unit 28 may be similar a set top box or an integrated receiver decoder and will be further described below.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. Cellular phones typically include a GPS locating system. As the vehicle 24 moves about, the exact coordinates in latitude and longitude may be used to determine the proper designated marketing area for local television and broadcasting.

The present invention may also be used for displaying wireless information on a personal mobile device 36 such as, but not limited to, a laptop computer 38, a personal digital assistant 39, and a cellular telephone 40. It should be noted that these devices and the automotive-based devices may also receive wireless signals having various types of information associated therewith from the cellular towers 34A and 34B.

The system may also be used in conventional fixed systems for homes and businesses. A business or home 42 is illustrated having a receiving unit 28 coupled to a display 54 such as a television. As will be evident below, the present invention may be used in different type of systems to allow users to rapidly review information. The disclosure is particularly suitable for helping people who are visually impaired to ascertain program guide information.

Figure 2:
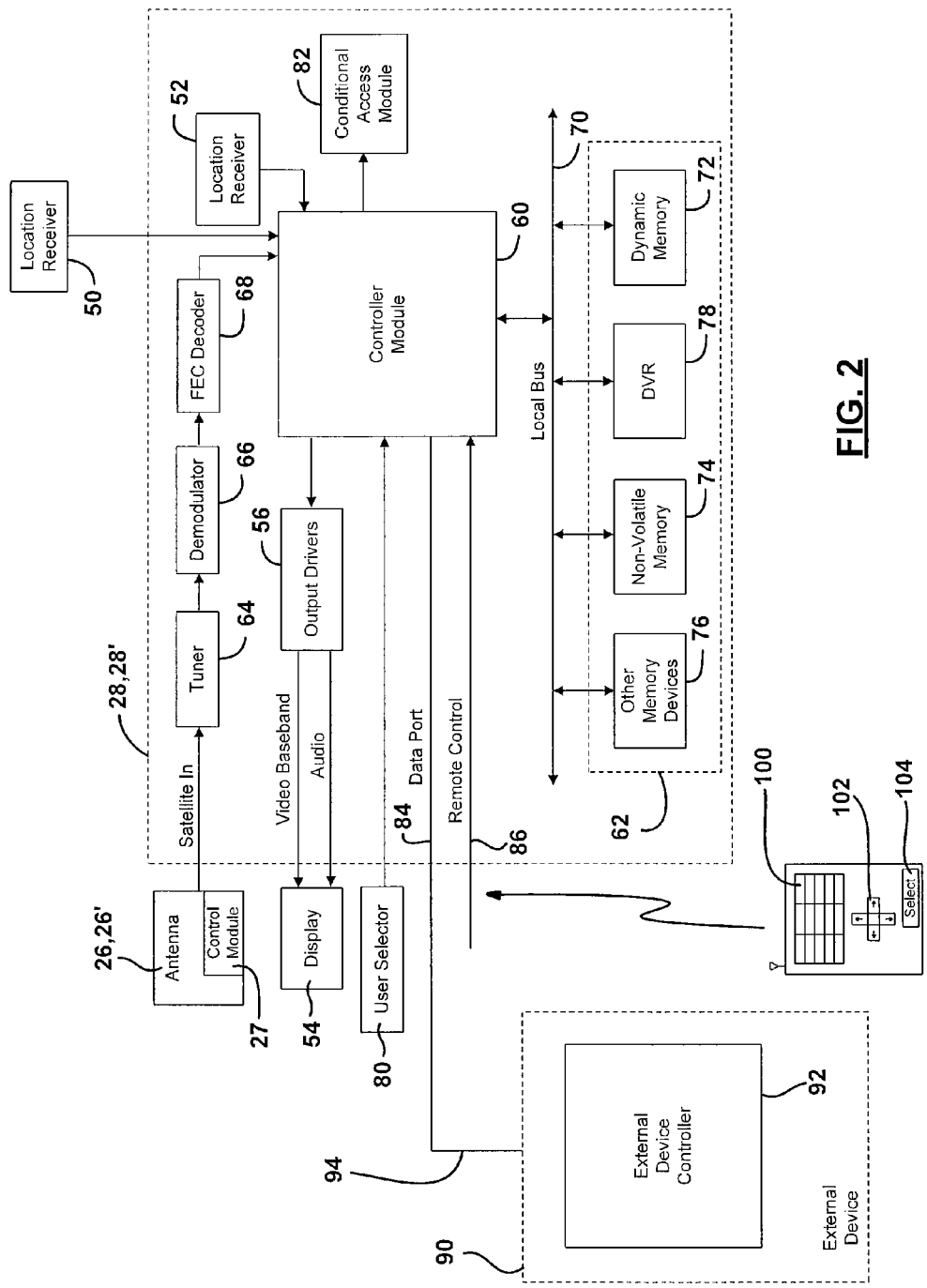
FIG. 2 is a block diagrammatic view of a receiving system according to the present invention.

Referring now to FIG. 2, a receiving unit 28 is illustrated in further detail. Although the receiving unit 28 is illustrated, or is merely representative of various electronic devices with internal controllers. The receiving unit 28 may also be configured similarly to the receiving unit 28' for a home-based system and, thus, a separate figure is not provided. In a home-based system, the location receivers 50 and 52 are not needed. Antenna 26 may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a location receiver 50 such as GPS receiver. The antenna 26 may also be an electronic antenna. The antenna 26 may include an internal controller 27 that controls the operation of the antenna 26. In a fixed home-based system the antenna 26' may be a fixed dish type antenna typically used in home satellite systems. The controller 27 is, thus, not needed in a home-based system.

The mobile receiver unit 28 may be coupled to antenna 26 with a two-way communication channel such as a wire or a wireless system. The mobile receiving unit 28 may also include a location receiver 52 integrated therein. The location receiver 52 may be a GPS receiver. In a preferred embodiment, only one location receiver 50, 52 may be provided in a mobile system. However, the location receiver 50, 52 may be part of the vehicle 24 or may be part of the mobile receiving system 22, 36. The controller 60 may be coupled directly to location receiver 52 and/or location receiver 50. The mobile receiving unit 28 includes a display 54. The display 54 may be incorporated into the device 36 or within the vehicle 24. The display 54 may include output drivers 56 used for generating the desired audio and video outputs suitable for the particular display 54.

A controller 60 may be a general processor such as a microprocessor. The controller 60 includes or logic that is used to coordinate and control the various functions of the receiving unit 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DirecTV set top boxes which employ a chip-based multifunctional controller.

The controller 60 may include or be coupled to a local bus 70. The local bus 70 may be coupled to a dynamic memory 72 such as RAM which changes often and whose contents may be lost upon the interruption of power or boot up. The bus 70 may also be coupled to a non-volatile memory 74. The non-volatile memory 74 may be an in-circuit programmable type memory. One example of non-volatile memory 74 is an EEPROM. One specific type of EEPROM is flash memory. Flash memory is suitable since it is sectored into blocks of data segments that may be individually erased and rewritten.

Other memory devices 76 may also be coupled to local bus 70. The other memory devices may include other types of dynamic memory or a non-volatile memory. Another device such device such as a digital video recorder 78 may also be coupled to the bus 70. The display 54 may be changed under the control of controller 60 in response to the data in the dynamic memory 72, non-volatile memory 74 or digital video recorder.

The controller 60 may also be coupled to a selector 80. Selector 80 may be various types of user interfaces such as a keyboard, push buttons, a touch screen, a voice activated interface, or the like. Selector 80 may be used to select a channel, select various information, change the volume, change the display appearance, or other functions. Information that may be selected includes a zoom-in and zoom-out mode and selecting various program guide elements. The user interface 64 is illustrated as part of the mobile receiving unit 28. However, should the unit be incorporated into a vehicle, the selector 80 may be located external to the mobile receiving unit such as dial buttons, voice activated system, or the like incorporated into the vehicle and interface with the mobile receiving unit 28.

A conditional access module card 82 (CAM) may also be incorporated into the mobile receiving unit. Access cards such as a conditional access module (CAM) cards are typically found in DirecTV units. The access card 82 may provide conditional access to various channels and wireless signals received from the satellite. Not having an access card or not having an up-to-date access card 66 may prevent the user from receiving or displaying wireless content from the system.

One specific type of selector 80 is a remote control device 98 having a key pad 100, an arrow key pad 102, and a select button 104 may also be provided. Inputs to the receiver 28 may be provided by the remote control device 28 or through another type of selector 80.

The controller 60 includes various logic or is capable of executing various logic to perform the various functions. The logic to perform various functions, including separating the program guide information from the television information within the receive signal, various preferences, controlling the visual display and controlling the audio display. This will be further described below.

Referring now to FIG. 2, the controller module 60 is illustrated in further detail. The controller module 60 is illustrated having further modules therein for performing various functions of the present disclosure. The logic may be stored in one of the memories listed above and executed by the controller module 60. Controller module 60 includes a separation module 140 that is used to separate the electronic program guide from the received television program signals. The packets received from the program guide may include different characteristics from the television signals. The program guide packets may be easily separated and stored within one of the various memory devices. The packets may include a different packet identifier transmitted with each packet so that identification may take place.

The controller module 60 may also include a preference module 142. The preference module 142 stores a preference corresponding to the user's interests. The preference module may determine the preference from user inputs selected by the user during a query process. Further preferences may also be determined based upon the types of programs stored by the user. That is, the preference module may learn the type of programming of interest to a user. The preferences may be stored in a memory with the receiving device. The controller or the preference module may compare the data, such as metadata, associated with program guide elements with the preferences to determine or change the visual and/or audio display. Comparison results may be absolute such as "interest," "no interest," or may vary depending on a grading system.

The controller module 60 may also include a visual display module 144. The visual display module 144 is used to change the appearance of the display 54 of FIG. 2. The visual display module may include a color module 146 and a zoom-in and zoom-out module 148. The color module 146 may be used to change the color in response to a preference signal received from the preference module 142. The color module may also be used to change the darkness or lightness of a particular color within a program guide element as will be described below. The darkness/lightness may correspond to a grade determined in response to the comparison.

The zoom-in and zoom-out module 148 may be used to zoom in or zoom out in a particular range or portion of the program guide. The zooming in will enlarge a particular portion of the program guide whereas zooming out will reduce the size of a portion of the program guide. Several orders of zooming in and zooming out may be possible using the zoom-in and zoom-out module 148.

An audio display module 152 may also be included within the controller module 60. The audio display module 152 is used to control audio queues associated with the program guide. For example, a tone module 154 may be used to generate different tones based upon the user preferences. A particular tone may, for example, correspond to a program element containing a program that the preference module 142 believes may be of interest to the user. The tones may be changed based upon the grading of the comparison.

The audio display module 152 may also include a description generator module 156. The description generator module may generate a computerized voice corresponding to the written description within a program guide element. For example, the description generator module may be used to read the material within the program guide element, such as the channel, network, title, program, time, rating, a brief description of the program, and other information.

The scope of the present disclosure includes both a visual display module 144 and an audio display module 152. A visual display module may be used alone or together with an audio display module 152. Likewise, an audio display module 152 may be used alone. The color module 146 and the zoom-in and zoom-out module 148 may be used together or used alone. Likewise, the tone module 154 may be used together with or separate from the description generator module 156.

Figure 3:
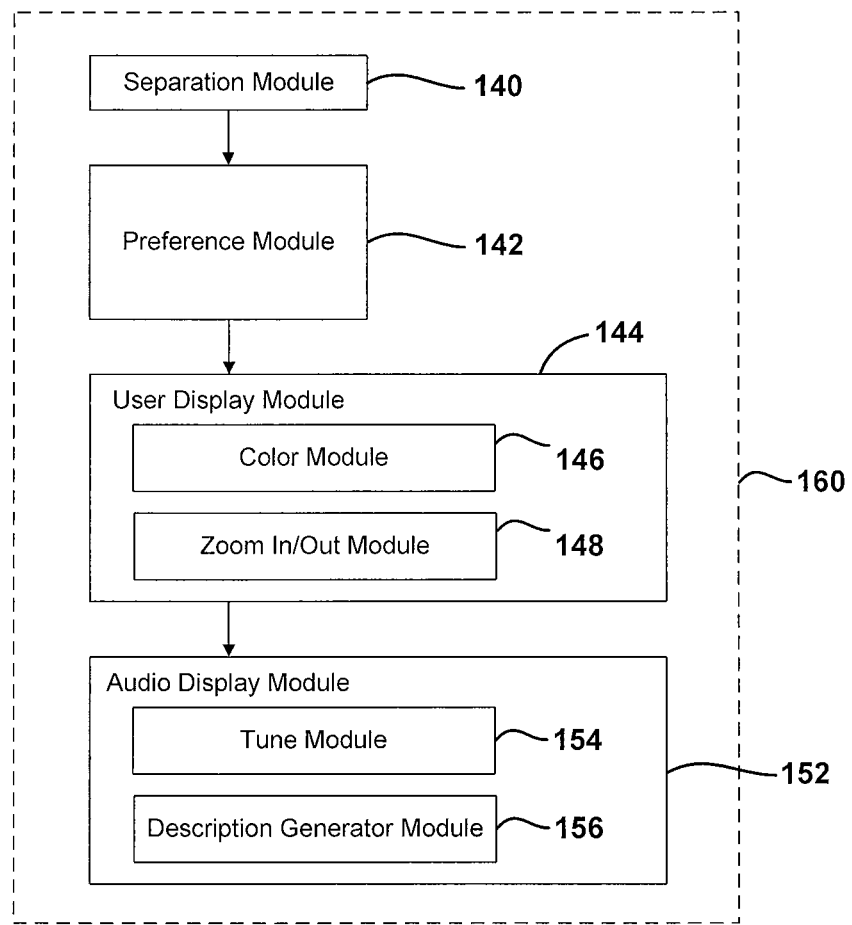
FIG. 3 is a block diagrammatic view of the controller of FIG. 2 having various modules.
Figure 4:
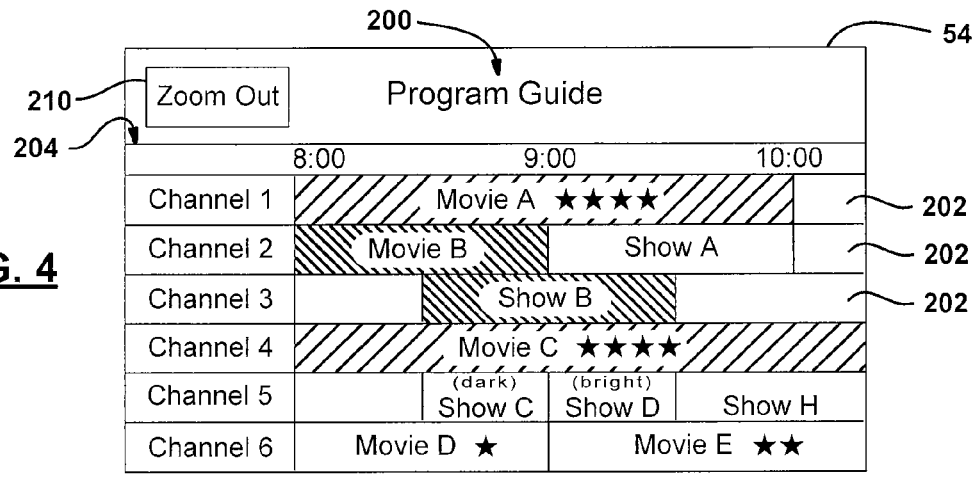
FIG. 4 is a screen display representing a first amount of information that may be displayed.

Referring now to FIG. 4, a display 54 illustrating an electronic program guide 200 is set forth. The program guide 200 has a plurality of program guide elements 202. The program guide elements 202 are illustrated as rectangular boxes. Shading is used in the program guide element of Movie A that contrasts with the shading within the program guide of Movie B. In one example, the difference in shading may correspond to a difference in color lightness and darkness. That is, movie A may be a light color indicating a desirable movie for the user. Movie B may be a darker color of the same color and, thus, indicates a movie that may be less desirable than Movie A. Different levels of shading may be used. The shading may, for example, correspond to a movie reviewer's star ratings or to a calculated interest or preference grading calculated in the preference module 142 in FIG. 3.

Another way in which color may be provided in the program guide 200 is to use the coloring to indicate various types of programming. For example, sports may be a red color, movies another color, reality shows another color, and so on. The lightness and darkness of the particular color corresponding to the movie or programming type may be bright or dark, depending on the user's interest. For example, dark red may represent a movie that may be more desirable than a lighter red color. A bright yellow sports guide element in the program guide may indicate a more desirable programming selection than a darker or less bright yellow color.

The program guide may also include a column 204 indicating a channel number. The channel number may also accompany a short abbreviation or description of the particular network.

A zoom-out button 210 may also be provided in the program guide. The zoom-out button 210 will be described in connection with FIG. 8 below. The zoom-out button 210 may provide more information within the program guide. This may prevent the user from easily seeing the printed text. In some instances, printed text may not even be provided.

Figure 5:
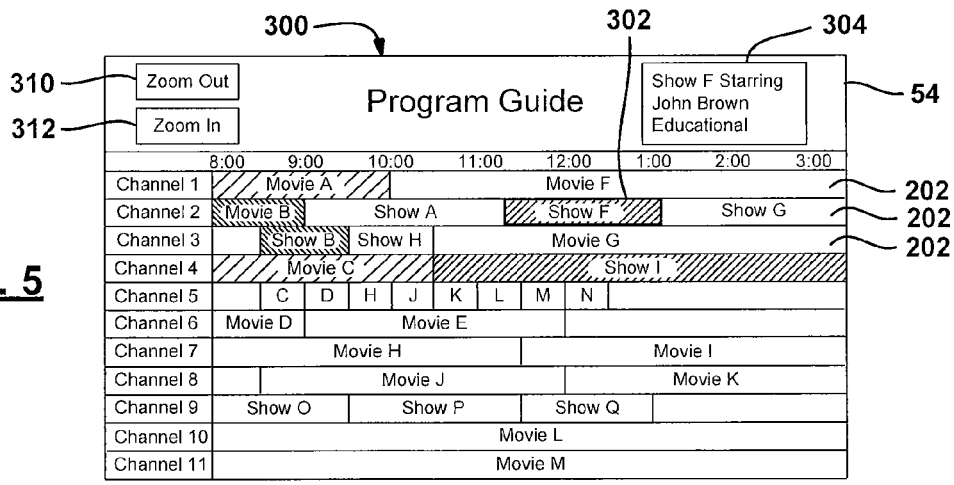
FIG. 5 is the screen display of FIG. 4 in a zoomed-out mode with a second amount of information greater than the first amount.

Referring now to FIG. 5, a program guide 300 is illustrated in a zoom-in mode compared to that of the program guide of FIG. 4. By using color, the program guide may quickly allow a user to move a cursor between the various elements 202. As illustrated in FIG. 5, Show F and Show I are colored with a color of interest. The cursor 302 illustrated by a dark box around Show F may be easily moved using the remote control device illustrated in FIG. 2. An enlarged box 304 may provide an enlarged view of the information provided within the smaller square associated with the position of the cursor 302. In this example, Show F stars John Brown and is educational. More information may be provided in box 304 depending on the amount of information desired to be displayed. Thus, in the zoom-out mode illustrated in FIG. 5, a high-level view of the program guide is shown with color-coordinated program elements. All elements 202 may be colored according to user preferences.

In this figure, a zoom-out button 310 and a zoom-in button 312 may be provided. That is, more of the program guide may be desired to be viewed by the user. Activating the zoom-out button 310 allows the user to see more of the program guide but the resolution may suffer, especially with respect to the text. However, moving the cursor around the screen may allow the user to see various elements. The user may easily pick out various colored elements of interest in the zoom-out mode. Activating the zoom-in button 312 may return the user to the program guide view illustrated in FIG. 4. Selection with the cursor may allow the information within the selected element to be displayed in the box 304.

Figure 6:
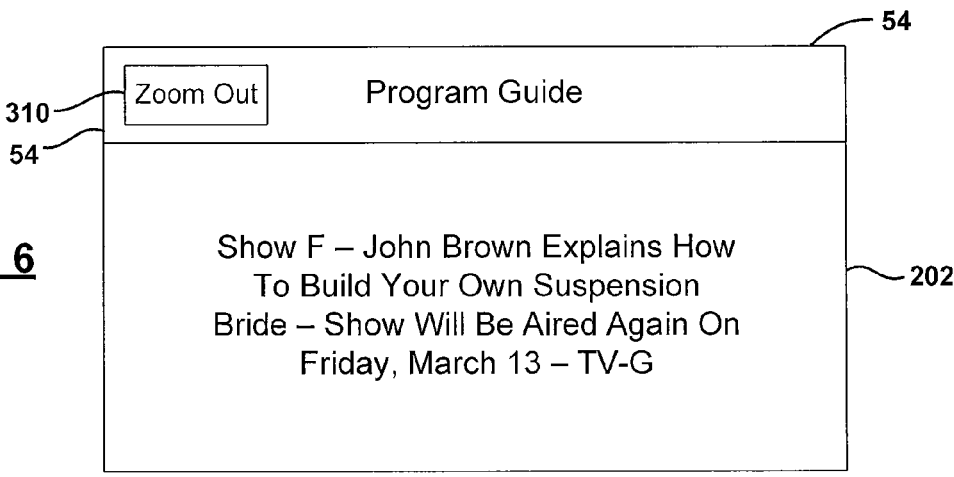
FIG. 6 is a screen display of an enlarged view of a program guide element of FIGS. 4 and 5.

Referring now to FIG. 6, in a zoom-in position, the program guide may zoom in on one particular program guide element 202. For example, the program guide element highlighted corresponds to the program guide element selected by cursor box 302 in FIG. 5. In this example, a title, a brief description of the program, the rating and information such as when the program will be aired, is set forth. Of course, other information may be provided in the program guide.

Figure 7:
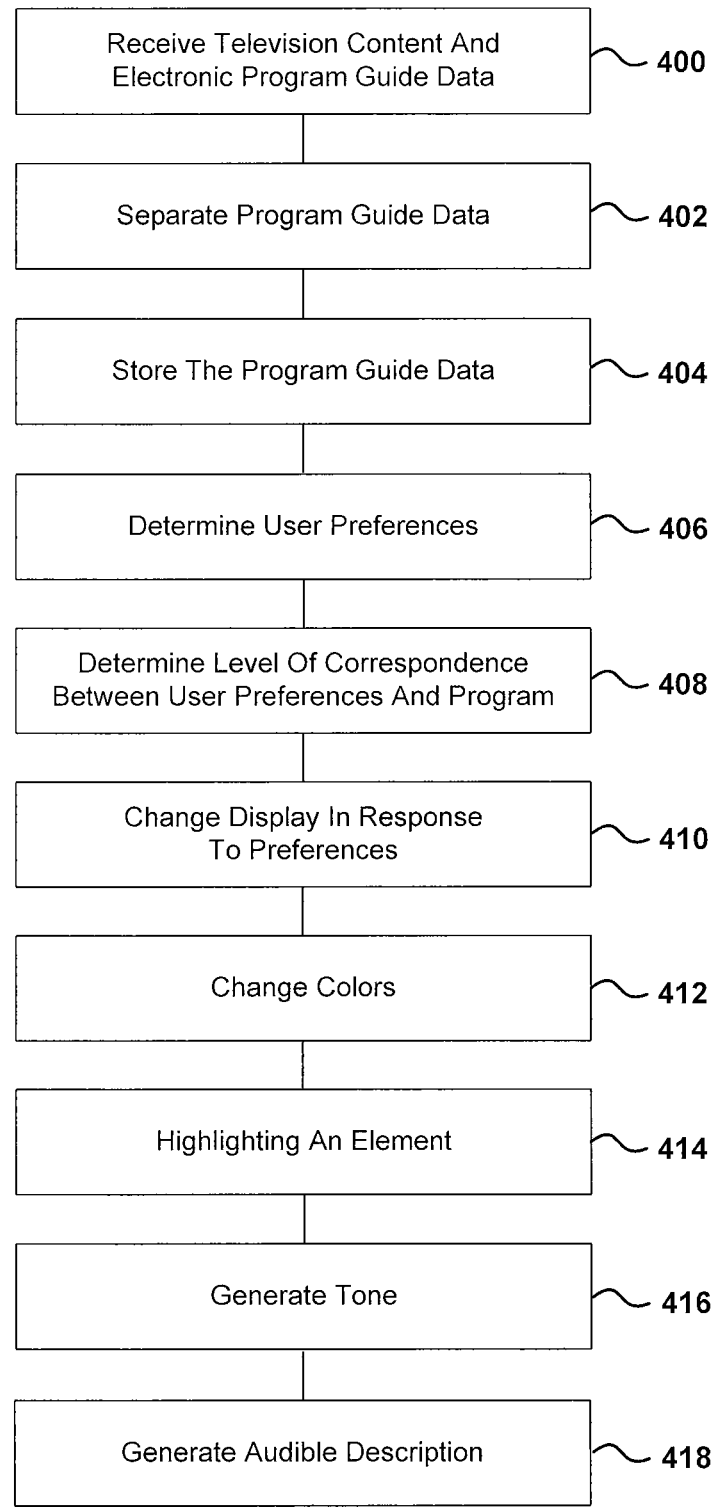
FIG. 7 is a flowchart illustrating one method for operating the present invention.

Referring now to FIG. 7, a method of operating the present invention is set forth. In step 400, television content and electronic program guide are received at the receiving unit 28. In step 402, the controller module 60, through the separation module 140 illustrated in FIG. 3, separates the program guide data from the television content and stores the program guide data in one of the memory devices in step 404. In step 406, the user preferences are determined. The user preferences may be determined in the preference module 142 of FIG. 3. The user preferences may, for example, be generated based upon responses to certain questions to ascertain the various interests of the user. Preferences may also be determined by monitoring the programs watched by the user. In step 408, a level of correspondence between the user preferences and the program may be determined in the controller. That is, the preference module 142 may deter line that various preferences correspond to the type of show received by comparing the television content and user preferences. The television content programming may include various metadata that is used to perform the comparison between the user preferences or interests and the received programming. In step 410, the display is changed in response to the preferences. The display may be changed in various manners or combinations of manners. For example, colors may be changed in step 412. The colors of various programming elements may be changed. Shades or the brightness of colors may also be changed. As mentioned above, the program guide elements may be colored according to program type but the brightness or shade of the color may be changed according to the user preferences. In step 414, the remote control device may be used to position a selector and highlight a particular programming element. In step 416, a tone may be generated that corresponds to a level of interest for the particular programming element. It should be noted that both colors and tones may be used or colors or tones may be used to highlight or communicate the level of interest for a particular program element.

In step 418, an audible description of the particular program element may be generated. As mentioned above, the program description may be read or may be provided within the data received for the program in a manner that may be communicated to the user. That is, text information may be provided with the broadcast program or within the program guide elements and sound files may also be included. That is, the sound files may be broadcast together with the program guide information to generate a brief description or detailed description of the content of the program guide element.

Figure 8:
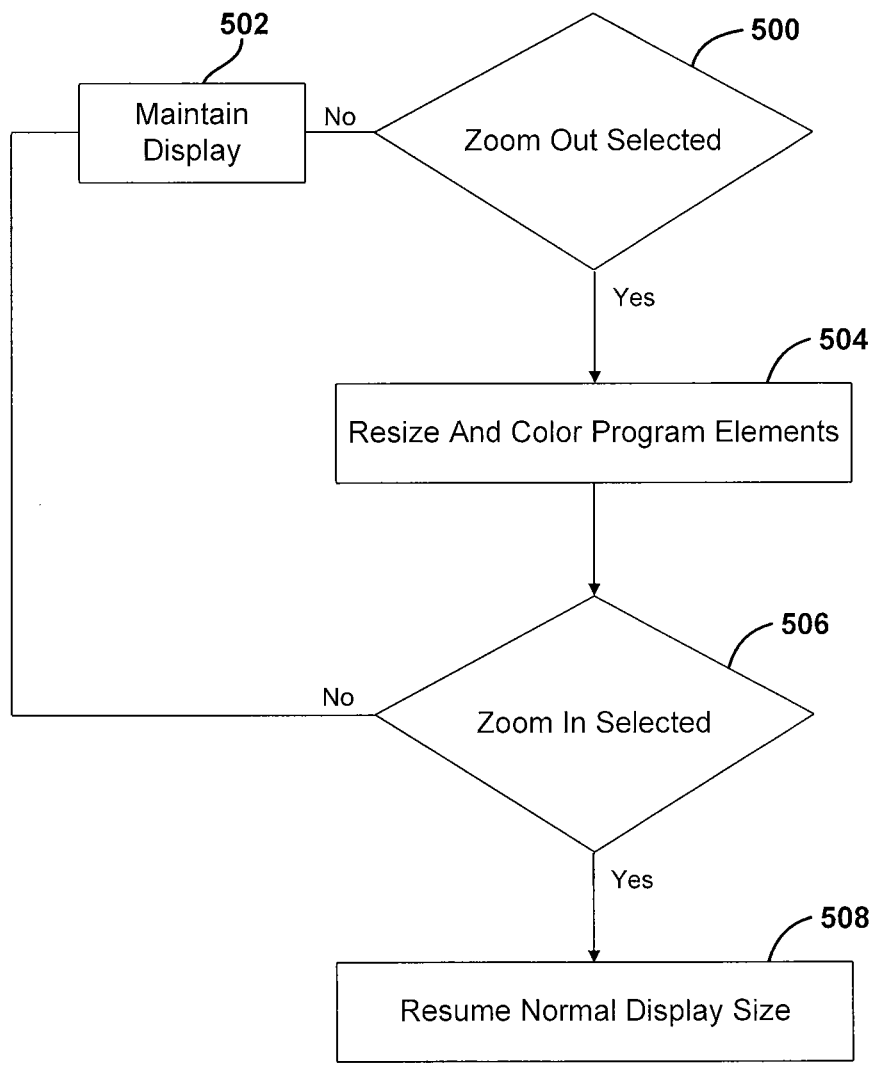
FIG. 8 is a flowchart for operating the zoom-in and zoom-out mode.

Referring now to FIG. 8, a method of operating a zoom-in and zoom-out function is illustrated. In step 500, if "zoom-out" in the program guide is not selected, step 502 maintains the display as it currently is. In step 500, if zoom-out is selected, step 504 resizes and colors the program elements. In step 506, if zoom-in is selected, step 508 resumes the normal size display.

In step 506, if zoom-in is not selected, the display may be maintained in step 502. It should also be noted that zooming in and zooming out may be performed in more than one step. That is, zooming out may be performed several times to include more and more of the program guide. The audible tones' visual appearance, such as a color, may be used for selecting elements of interest, rather than relying on written text within the program guide elements themselves.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of generating an electronic program guide comprising:

receiving television content and electronic program guide data;

separating the program guide data including a program type from the television content;

storing the program guide data;

determining user preferences from user-selected settings;

comparing the program guide data to the user preferences to determine a grade corresponding to a variable level of correspondence of the user preferences and the program guide data; and displaying a plurality of program guide elements in a display having a color corresponding to the program type and a brightness corresponding to the grade so that different grades have different brightness.

2. A method as recited in claim 1 wherein receiving the television content comprises receiving the television content and the electronic program guide data from a satellite.

3. A method as recited in claim 1 wherein receiving the television content and electronic program guide comprises receiving the television content and electronic program guide data at a satellite television receiving unit.

4. A method as recited in claim 1 wherein receiving the television content and electronic program guide data comprises receiving the television content and electronic program guide data at a mobile satellite television receiving unit.

5. A method as recited in claim 1 wherein determining user preferences comprises determining the user preference from previously viewed programming.

6. A method as recited in claim 1 wherein determining user preferences comprises determining user preferences from responses to questions.

7. A system comprising:

a receiving unit having a controller module that receives television content and electronic program guide data having a program type;

said controller module comprising a separation module separating the program guide data from the television content;

said controller module storing the program guide data;

said controller module further comprising a preference module determining user preferences from user-selected settings;

said controller module comparing the program guide data to the user preferences to determine a grade corresponding to a variable level of correspondence of the user preferences and the program guide data; and a visual display module that changes a display by changing a color of a plurality of program guide elements in response to the program type and changes a brightness in response to the grade so that different grades have different brightnesses.

8. A system as recited in claim 7 wherein the controller determines user preferences from responses to questions.

* * * * *